Figure 1:
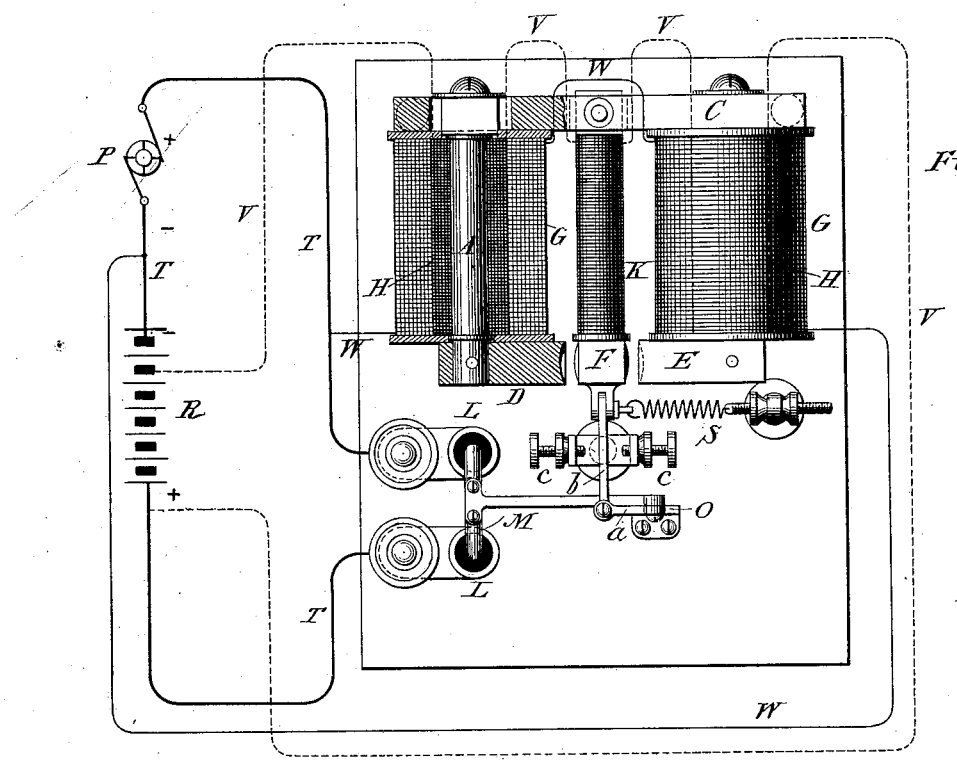

(No Model.)

G. B. PRESCOTT, Jr.
CUT-OUT FOR SECONDARY BATTERIES.

No. 357,627. Patented Feb. 15, 1887.

WITNESSES:

INVENTOR
George B. Prescott Jr.
BY
Parker W. Page.
ATTORNEY

UNITED STATES PATENT OFFICE.

GEORGE B. PRESCOTT, JR., OF NEWARK, NEW JERSEY, ASSIGNOR TO THE UNITED STATES ELECTRIC LIGHTING COMPANY, OF NEW YORK, N. Y.

CUT-OUT FOR SECONDARY BATTERIES.

SPECIFICATION forming part of Letters Patent No. 357,627, dated February 15, 1887.

Application filed November 7, 1885. Serial No. 182,094. (No model.)

*To all whom it may concern:*

Be it known that I, GEORGE B. PRESCOTT, Jr., a citizen of the United States, residing at Newark, in the county of Essex and State of New Jersey, have invented certain new and useful Improvements in Cut-Outs for Secondary Batteries, of which the following is a specification, reference being had to the drawings accompanying and forming a part of the same.

My invention is an apparatus for use with secondary batteries, being what is termed an "automatic cut-out," and designed to connect the battery with a charging-circuit or to disconnect it therefrom, under conditions hereinafter described.

The invention is an improvement on an apparatus invented by me and described in Patent No. 327,964, of October 6, 1885, the improvements residing in a novel construction which greatly simplifies the instrument, and a plan of electrical connections that renders the operation much more efficient and sure.

In the patent referred to the dynamo machine or generator and a secondary battery are connected by a circuit in which is a circuit-breaker. This is controlled by an electro-magnet consisting of a polarized pivoted spring-controlled armature arranged to vibrate between poles of the opposite polarity, each of which poles is wound with two coils, one in the main or charging circuit and the other in a derived or shunt circuit around the dynamo. There is also a small magnet in the main circuit, which operates a circuit-breaker in the derived circuit. With this device the dynamo and battery are connected whenever the electro-motive force produced by the dynamo has reached a predetermined limit, and disconnected whenever the electro-motive force falls below the limit, or when the battery has become charged.

The apparatus forming the subject of my present invention is designed to accomplish the same results. In its construction, however, it differs from that described, in that the vibrating armature is an electro-magnet, as are also the two cores or magnets that control its position. The circuit-connections, too, are different. In the circuit connecting the dynamo and battery is placed the circuit-breaker. The stationary cores of the magnet are wound each with two coils. A circuit of high resistance, including a greater portion, but not all, of the battery-cells, includes one coil on each core and that also on the armature. A derived circuit taken from the main on opposite sides of the machine includes the other coils of the magnet. Both of the circuits that surround the magnet-cores are of high resistance, in order that they may take but a small portion of the current. That including the armature-coil produces the magnetic conditions that maintain the charging-circuit interrupted, while the other tends to neutralize this effect and to close the charging-circuit; hence as long as the electro-magnetic force of the generator exceeds that of the battery the charging-circuit will be closed. The circuit including the armature-coil and one coil on each core of the magnet is made to include less than the whole number of battery-cells, for the reason that the difference of potential at the battery is nearly the same as at the dynamo when the latter is running, so that if this circuit included the whole number of cells there would be a practically constant electro-motive force therein, while it is desirable that this should vary. In the drawings this construction and arrangement are more fully shown.

Figure 2:
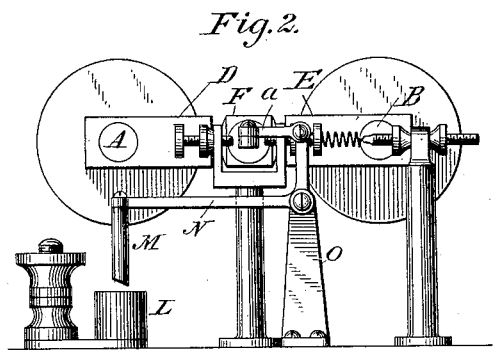

Figure 1 is a plan and part sectional view of the apparatus, with a diagram of the circuit-connections. Fig. 2 is an end view of the cut-out mechanism.

A and B are the cores of an electro-magnet secured to the cross-bars C. These cores have pole-pieces D E, between which is located a soft-iron armature, F, pivoted to the bar C. Each of the cores A B is wound with two coils, G H, superposed or applied in other equivalent ways. If they are superposed, as in the present case, the outer coil is made to contain a greater number of layers, in order to balance its magnetizing effect as compared with the other or inner coil. The armature F is also surrounded by a coil, K.

L L are mercury-cups arranged to be joined by a copper yoke, M, carried at the end of a bell-crank lever, N, pivoted to a standard, O. This lever is connected with the armature F in any proper manner, so that the sidewise movement of the armature will raise or lower the yoke M and thereby connect or disconnect the mercury-cups L L. A simple form of connection is shown in the two links $a$ and $b$, connected to the end of the lever N and of the armature, respectively. Adjustable stops $c$ are placed on opposite sides of the link $b$ to limit the movement and prevent the armature from touching the poles of the magnet. As a further precaution, the faces of the poles or the armature may be coated or protected by plates or pieces of non-magnetic material. A spring, S, is connected to the armature and tends to hold it in the position in which it raises the yoke M and disconnects the mercury-cups L L.

P represents the dynamo machine or generator, R the secondary battery, and T the circuit connecting the two. The wires of this circuit are connected to the mercury-cups L L, so that the circuit is closed when the cups are spanned by the yoke M, but broken when the yoke is raised.

V is a circuit of high resistance, including less than the whole number of the secondary-battery cells and the coils H H and K. W is another circuit of high resistance, run from the main circuit T on opposite sides of the generator and including the coils G G.

If the battery contains no charge, the armature F is drawn over by the spring and the circuit T interrupted. On starting up the dynamo for the first time the circuit T must be closed by hand; but if any charge remains in the battery the armature F is magnetized. As soon, then, as the current in the circuit W overcomes the magnetizing effect of circuit V and the resistance of the spring S, the armature, which has it will be supposed a north polarity, is repelled by the pole E and attracted by the pole D, and the circuit T closed. This condition of things continues during the charging of the battery, but may be reversed by several causes. For instance, as the battery approaches the condition of saturation the relatively greater amount of current which passes through the circuit V, as compared with that in circuit W, neutralizes the effect of the latter until a point is reached at which, with the assistance of the spring S, the armature is drawn over and circuit T broken. On the other hand, if the speed of the machine should slacken, or its electro-motive force for any reason should fall below that of the battery, the proportion of current that passes through circuit V, with the aid of the spring, neutralizes the effect of the circuit W and the battery is instantly disconnected from the machine. Should the machine stop, the current in circuit W practically ceases, so that the cut-out operates instantly.

For the proper operation of the device it is necessary to adjust or balance the resistances and magnetizing effects of the coils G H, so that the former will have sufficient effect to neutralize the other and to disconnect the battery whenever the electro-motive force of the battery equals or exceeds that of the machine or approaches it to a certain predetermined limit. This is a well-understood matter, and is accomplished by placing the coils H nearer the core than the coils G, or by making the coils H with a greater number of turns, or by other like means. This arrangement may be said, in general terms, to comprise a branched circuit from a dynamo-machine, in one branch of which is the secondary battery and the circuit-breaker, and in the other, which is of high resistance, is the magnet which controls the circuit-breaker in the first circuit. A certain force opposes the magnetizing effect of the high-resistance branch. A part of this opposition is in the spring; but for the successful operation of the device it is necessary to have, in addition to this, a varying force, which exerts itself by neutralizing the effect of the branch circuit W. This is attained by the use of a differential magnet, one of the circuits of which is the branch described, the other a circuit including a portion of the secondary battery. The armature, to secure greater sensitiveness and a positive action in both directions, is polarized; and, instead of using a permanent or other magnet to polarize it, it is itself made a magnet, the secondary battery-circuit being, for convenience, utilized for this purpose.

This apparatus may be placed at any convenient point near to or remote from the generator or battery, or both. It provides full protection against injury to either from the accidental or intentional lowering of the electro-motive force of the generator, and connects and disconnects the generator and battery at the proper times.

What I claim is—

1. The combination, with a circuit including a generator, a secondary battery, and a circuit-breaker, of an electro-magnet in a branch circuit for controlling the circuit-breaker, and means for exerting a varying force in opposition to the effect of the branch circuit, as set forth.

2. The combination, with a circuit including a generator, a secondary battery, and a circuit-breaker, of a differential electro-magnet for controlling the circuit-breaker, the coils of the magnet being included in a branch of the dynamo or charging circuit and a circuit from a portion of the battery, respectively, and in the manner described.

3. The combination, with a circuit including a generator, a secondary battery, and a circuit-breaker, of a differential electro-magnet, the coils of which are in a branch from the dynamo or charging circuit and a circuit from a portion of the battery, respectively, and a polarized armature connected with the circuit-breaker, as herein described.

4. The combination, with a circuit containing a generator, a secondary battery, and a circuit-breaker, of a differential magnet, the coils of which are included in a branch from the dynamo or charging circuit and a circuit from a portion of the battery, respectively, an armature surrounded by a coil included in the circuit from the battery, and connections between the armature and circuit-breaker, as set forth.

5. The combination, with a circuit including a generator, a secondary battery, and a circuit-breaker, of a differential magnet, the coils of which are included in a branch from the dynamo or charging circuit and in a circuit from a portion of the battery, respectively, a polarized armature connected with the circuit-breaker and arranged to vibrate between the poles of the magnet, and a retractile spring for assisting the effect produced by the battery-circuit on the armature, as set forth.

GEO. B. PRESCOTT, JR.

Witnesses:
HENRY A. BECKMEYER,
RICHARD WM. BLOEMEKE.